US010832348B2

(12) United States Patent
Gamaley et al.

(10) Patent No.: US 10,832,348 B2
(45) Date of Patent: Nov. 10, 2020

(54) TOPIC RECOMMENDATION IN A SOCIAL NETWORK ENVIRONMENT

(71) Applicant: INTERNATIONAL BUSINESS MACHINES CORPORATION, Armonk, NY (US)

(72) Inventors: Vladimir Gamaley, Rehovot (IL); Gili Nachum, Bet-Shemesh (IL); Andrew L. Schirmer, Andover, MA (US); Eitan Shapiro, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 381 days.

(21) Appl. No.: 14/074,896

(22) Filed: Nov. 8, 2013

(65) Prior Publication Data
US 2015/0134655 A1 May 14, 2015

(51) Int. Cl.
*G06F 16/9535* (2019.01)
*G06Q 50/00* (2012.01)

(52) U.S. Cl.
CPC ......... *G06Q 50/01* (2013.01); *G06F 16/9535* (2019.01)

(58) Field of Classification Search
CPC ................................................ G06F 17/30867
See application file for complete search history.

(56) References Cited

U.S. PATENT DOCUMENTS

| 2006/0161535 | A1* | 7/2006 | Holbrook | .......... | G06F 17/30696 |
| 2010/0042910 | A1 | 2/2010 | Manolescu et al. | | |
| 2011/0302117 | A1 | 12/2011 | Pinckney et al. | | |
| 2012/0102113 | A1 | 4/2012 | Chartier et al. | | |
| 2012/0185779 | A1 | 7/2012 | Dugan et al. | | |
| 2012/0233191 | A1 | 9/2012 | Ramanujam | | |
| 2012/0254097 | A1 | 10/2012 | Flinn et al. | | |
| 2012/0296920 | A1 | 11/2012 | Sahni et al. | | |
| 2013/0018957 | A1* | 1/2013 | Parnaby | ................. | G06Q 10/10 709/204 |
| 2013/0054693 | A1 | 2/2013 | Chennamadhavuni | | |
| 2015/0112995 | A1* | 4/2015 | Elyada | .............. | G06F 17/30867 707/738 |
| 2015/0120466 | A1* | 4/2015 | Redlich | ................ | G06Q 20/145 705/14.69 |

OTHER PUBLICATIONS

Geyer et al., "Inspired by the Audience—A Topic Suggestion System for Blog Writers and Readers", CSCW '10 Proceedings of the 2010 ACM conference on Computer supported cooperative work, pp. 237-240, 2010.
Dugan et al., "Lessons Learned From Blog Muse: Audience-Based Inspiration for Bloggers", CHI '10 Proceedings of the SIGCHI Conference on Human Factors in Computing Systems, pp. 1965-1974, 2010.
Phelan et al., "Using Twitter to Recommend Real-Time Topical News", RecSys '09 Proceedings of the third ACM conference on Recommender systems, pp. 385-388, 2009.

* cited by examiner

*Primary Examiner* — Kris E Mackes
(74) *Attorney, Agent, or Firm* — Cuenot, Forsythe & Kim, LLC (57) ABSTRACT

Techniques for topic recommendation are described herein. The techniques include a method that topic recommendation includes identifying topics associated with events within a social network environment. A rank may be determined indicating interest for an identified topic within the social network environment. The method may include recommending a topic to a user for posting in the social network environment based on the rank.

11 Claims, 5 Drawing Sheets

TOPIC RECOMMENDATION IN A SOCIAL NETWORK ENVIRONMENT

BACKGROUND

The present invention relates to the field of topic recommendations and, more particularly, to topic recommendations in a social network environment.

Social network environments include networked computing devices wherein users provide content within the social network environments. Content may be provided by users through postings such as blog posts, microblog posts such as status updates, object sharing, and automated activity posting.

BRIEF SUMMARY

In one embodiment, a method for topic recommendation is described herein. The method may include identifying topics associated with events within a social network environment. A rank may be determined indicating interest for an identified topic within the social network environment. The method may include recommending a topic to a user for posting in the social network environment based on the rank. In embodiments, the rank may be based on different factors including subsets of users within the social network environment that a given user is associated with, or other factors such as frequency, recentcy, uniqueness, and the like.

DETAILED DESCRIPTION

Embodiments of the subject matter disclosed herein relates to techniques for topic recommendations within a social network environment. Social network environments include content posted by users of a social network environment. User-generated content may be useful in supporting knowledge sharing, such as in an enterprise social network of a business entity, for example. Despite the benefits of knowledge sharing within a given social network environment, participation may be difficult to encourage. The subject matter described herein may encourage knowledge sharing by recommending topics for posting within the social network environment.

A social network environment, as referred to herein, is a social structure including users and a set of dyadic ties between the users implemented within a networked computing device environment. A social network environment may be open to the public, may be secured based on membership within an organization such a business entity, or may be a combination. A social network related to a business entity may include postings related to the work activity a given user within the social networking environment. Some users within the social network environment related to a business entity may be recognized as supervisors or managers of other users based on a hierarchy of the business. Topics may be recommended to a user based on the hierarchy of the business for example, and/or based on additional elements discussed in more detail below.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
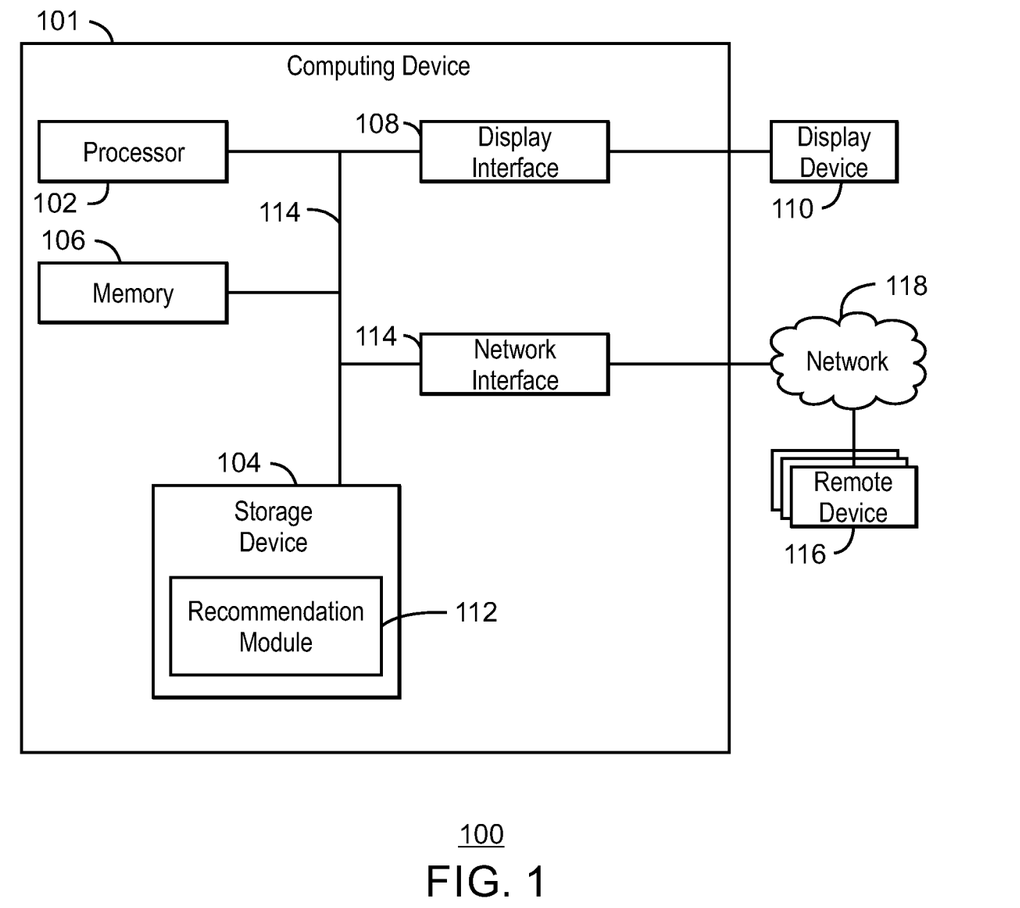
FIG. 1 is a block diagram of a computing system configured to recommend topics within a social network environment.

FIG. 1 is a block diagram of a computing system configured to recommend topics within a social network environment. The computing system 100 may include a computing device 101 having a processor 102, a storage device 104 comprising a non-transitory computer-readable medium, a memory device 106, a display interface 108 communicatively coupled to a display device 110. The storage device 104 may include a recommendation module 112 configured to recommend topics for posting within a social network environment.

In some embodiments, the computing device 101 may include a network interface 114 configured to enable remote devices 116 to communicate via the network 118 with the computing device 101. In embodiments, the computing device 101 may be a consumer computing device, such as a laptop, desktop, mobile device, tablet computing device, and the like, wherein the recommendation module 112 is located on the storage device 104. In some embodiments, the recommendation module 112 is incorporated at a computing device such as a server computer connected to the network 116, as discussed in more detail below. In either embodiment, the recommendation module 112 may enable a user to review recommendation topics by rendering the recommendations at a graphical user interface at the display device 110.

The recommendation module 112 may be logic, at least partially comprising hardware logic. In embodiments, the recommendation module 112 may be implemented as instructions executable by a processing device, such as the processor 102. The instructions may direct the processor to identify topics associated with events within a social network environment. The instructions may direct the processor to determine a rank indicating interest for an identified topic within the social network environment. Further, a topic may be recommended to a user for posting in the social network environment based on the rank.

For example, a user may start the process of posting a new status update within the social network environment. The recommendation module 112 may render a list of ranked topics to post about. As discussed in more detail below, the topics may be ranked based on topics the user was recently involved with, topics the user's social network may be interested in reading, subsets of a user's social network, among others.

The block diagram of FIG. 1 is not intended to indicate that the computing device 101 is to include all of the components shown in FIG. 1. Further, the computing device 101 may include any number of additional components not shown in FIG. 1, depending on the details of the specific implementation.

Figure 2:
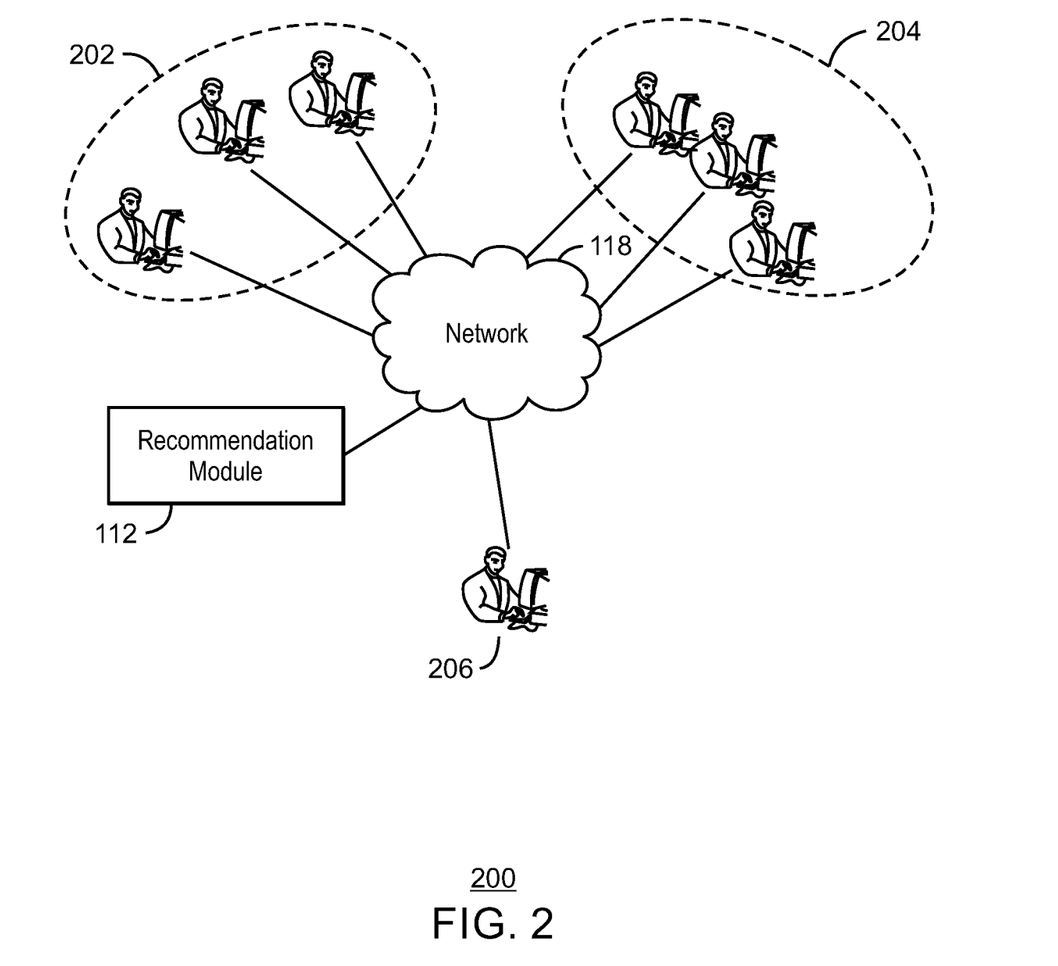
FIG. 2 is a diagram illustrating a social network environment including subsets of users for which topics may be recommended.

FIG. 2 is a diagram illustrating a social network environment including subsets of users for which topics may be recommended. The social network environment 200 includes subsets 202, 204 that are subsets of the social network environment 200 in relation to a user 206. The user 206 may be connected to the social network environment 200 via the network 118, and the recommendation module 112 may be configured to recommend topics to the user 206 as discussed above in relation to FIG. 1. The recommendation module 112 may be incorporated at a server computer (not shown) remote from the computing devices of users within the social network environment 200.

As discussed above in relation to FIG. 1, recommendations may be ranked bases including, among other things, a subset of a given user's social network environment. For example, a topic may be recommended to the user 206 based on the recommended topic being of interest to the user's manager(s) or supervisor(s), the user's subordinate(s), and the like. In some scenarios, the user's position as a subordinate within an enterprise business environment may be used to determine a rank for a topic. For example, topics may be ranked differently for a lower-level subordinate than for a higher-level manager.

In some embodiments, a subset of the social network environment includes the user alone. In this scenario, a topic may be recommended based on a topic being determined to be of interest to the user 206. In some embodiments, a subset of the social network environment may include followers of the user 206. For example, the user 206 may be associated with a larger set of people 202 and 204 within the social network environment and may have a subset 204 people within the social network that are following the user 206. Therefore, the recommended topic may be ranked based on a given subset of users or subset of the social network environment.

The ranking of topics may also be based on whether a user has an actor or target role, or any combination of an actor or target role in an event within an activity stream of the social network environment. For example, a first user may post a status update explicitly mentioning a second user. In this scenario, the second user is the target of the post from the first user. As another example, a user may post a status update and the status update of the user may be regarded as the user in an actor role.

In some embodiments, the ranking of a topic may be based on whether the topic is associated with events in a status update in which the user is a target, and for which a user's follower is an actor, may be used to determine the rank of the topic. In some embodiments, the composite rank may take into account a plurality of the ranking bases as illustrated in Table 1 to determine a composite score to determine a ranking.

TABLE 1

| User's Topic | Rank for User | Rank for followers of the user | Rank for user's network | Rank for user's management chain | Popularity Liked | Popularity Reposted | Popularity Comments | Composite Score | Rank |
|---|---|---|---|---|---|---|---|---|---|
| lorem | 1 | 83 | 243 | 565 | 6.05 | 1.55 | 10.74 | 1,146.75 | 12 |
| ipsum | 2 | 89 | 240 | 501 | 1.23 | 2.11 | 2.01 | 111.48 | 5 |
| dolor | 3 | 152 | 211 | 617 | 2.5 | 29.41 | 1.12 | 4,854.03 | 17 |
| sit | 4 | 162 | 99 | 169 | 1.4 | 1.25 | 2.53 | 48.29 | 1 |
| amet | 5 | 235 | 304 | 844 | 11.46 | 3.67 | 3.09 | 39,124.36 | 28 |
| consectetuer | 6 | 247 | 45 | 366 | 2.6 | 1.64 | 2.05 | 213.61 | 7 |
| adipiscing | 7 | 65 | 151 | 902 | 1.15 | 3.17 | 2.58 | 579.70 | 9 |
| elit | 8 | 146 | 220 | 893 | 5.89 | 1.99 | 2.66 | 7,187.12 | 18 |
| mauris | 9 | 239 | 320 | 974 | 1.23 | 1.16 | 8.56 | 8,149.74 | 19 |
| mollis | 10 | 61 | 122 | 305 | 1.26 | 1.19 | 1.47 | 49.77 | 2 | which a follower of the user 202 has an actor role, a target role, or any combination of an actor role and target role. For example, a topic may be ranked higher when a follower of the user has been identified as having an actor or target role within an event associated with the topic.

In some embodiments, the ranking of a topic is based on whether the topic is associated with events for which, or in which, a manager of the user has an actor role, a target role, or any combination of an actor role and a target role. For example, a topic may be ranked higher when a manager of the user 202 is identified as having an actor or target role in an event associated with a given topic.

In some embodiments, ranking may be based on the recentcy of an event associated with the topic. For example, a topic may be ranked higher if it is associated with an event that has just recently happened within the last 10 minutes, as opposed to an event that happened within the last week that may be ranked lower in relation.

In embodiments, ranking may be based on the uniqueness of the topic in relation to other topics. In this embodiment, the uniqueness may be based on a predetermined range. For example, a topic that has occurred within the activity stream 10 times within the last ten minutes may be determined to be relatively non-unique and may not be ranked higher compared to a topic that has occurred once in the last ten minutes. However, while a topic that has occurred within the activity stream 1 time within the last week may be relatively unique, but unpopular. Therefore, a topic that has occurred 3 times in the past week may be relatively unique but relatively popular comparatively and may be ranked higher than the topic occurring 1 time within the last week.

In embodiments, ranking may be based on the type of event associated with the topic. For example, an event may include a posting of a document associated with a project the user is involved in. In this scenario, the document associated with the user may be used to rank a topic associated with the document relatively higher than a status post about the document for example.

Other ranking bases may be considered. For example, ranking bases may include popularity, such as the number of "likes" for a given event, the number of reposts of given event, the number of comments associated with a given event and the like. In embodiments, ranking may be based on a composite rank of any of the ranking bases discussed herein. For example, the ranking of a topic associated with As illustrated in Table 1, a given topic may be ranked first for the user but not for the user's followers, management chain, or the social network as a whole, as illustrated for the topic "lorem." Further, the rank for a given basis may differ as illustrated in Table 1 with regard to the rank of popularity in terms of "likes," reposts, and comments for a given topic. Other ranking bases may be considered. The composite score in Table 1 is determined by multiplying all the columns for a given topic together and ranking the results as illustrated in the column labeled "rank." Other ranking methods may be used in computing a composite score, or in computing rank generally.

Figure 3:
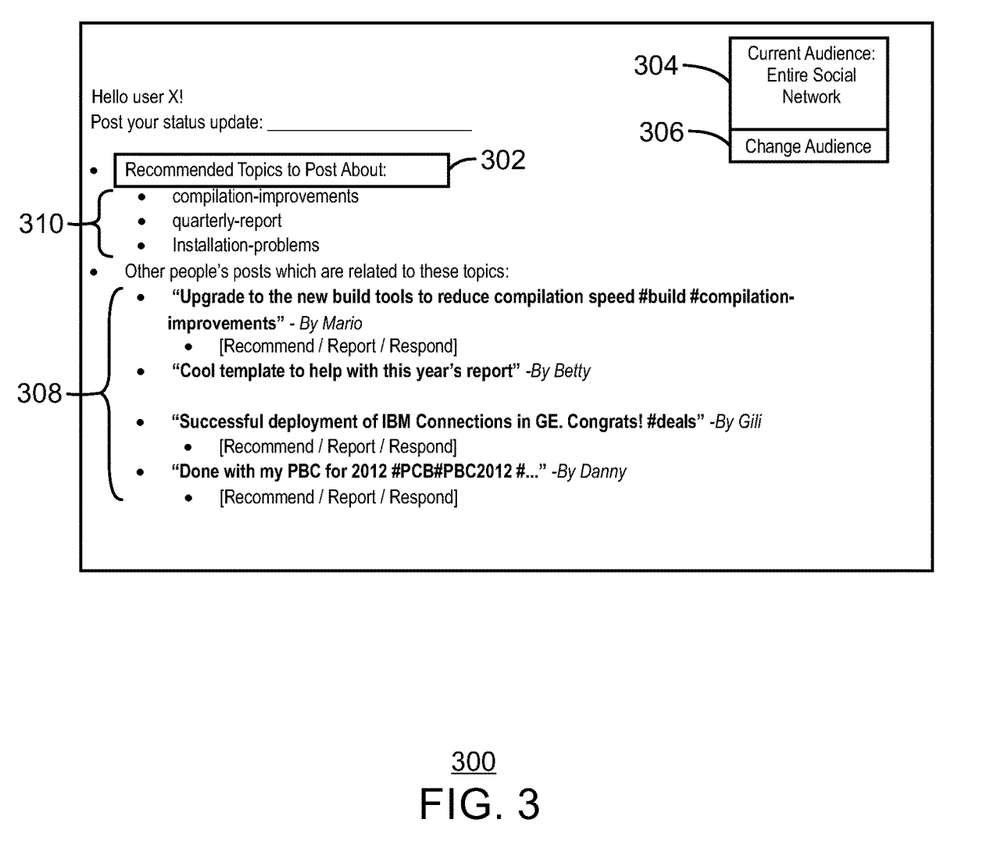
FIG. 3 is an example of a graphical user interface configured to render topic recommendations to a user of a social network environment.

FIG. 3 is an example of a graphical user interface configured to render topic recommendations to a user of a social network environment. The graphical user interface (GUI) 300 may be rendered at a display device such as the display device 110 of FIG. 1. As illustrated in FIG. 3, topics may be recommended, as indicated at 302, to the user via rendering in the GUI 300 in view of the recommendation techniques discussed herein. The currently selected audience may be displayed as indicated at 304. At 306, the option to change the audience may be displayed enabling the user to select a subset of the social network for which recommendations are determined to target. At 308, recent posts associated with recommended topics may be compiled. Further, the user may be recommended reposting of one or more of the recent posts 308.

In some embodiments, the quantity of recommendations may be adjusted based on the rank of the topic. For example, the number of recommendations at 310 may be set to topics having the three highest ranks. In this scenario, the recommendations 310 may include the first highest ranked topic, the second highest ranked topic, and the third highest ranked topic.

In some embodiments, ranking may take into account the recentcy of recommendations. For example, another ranking factor would be to rank topics that have already been presented to the user as lower in comparison to topics that have not been presented to the user. In some embodiments, the ranking based on recentcy of recommendations may also take into account the topics that have been presented to the user and the user has not posted about. For example, the ranking factor may be in part based on whether a given topic has been presented for recommendation to the user and whether the user had used the given topic to post about. If the topic has been used, then the topic may be ranked lower in comparison to a topic which the user has not posted about.

Figure 4:
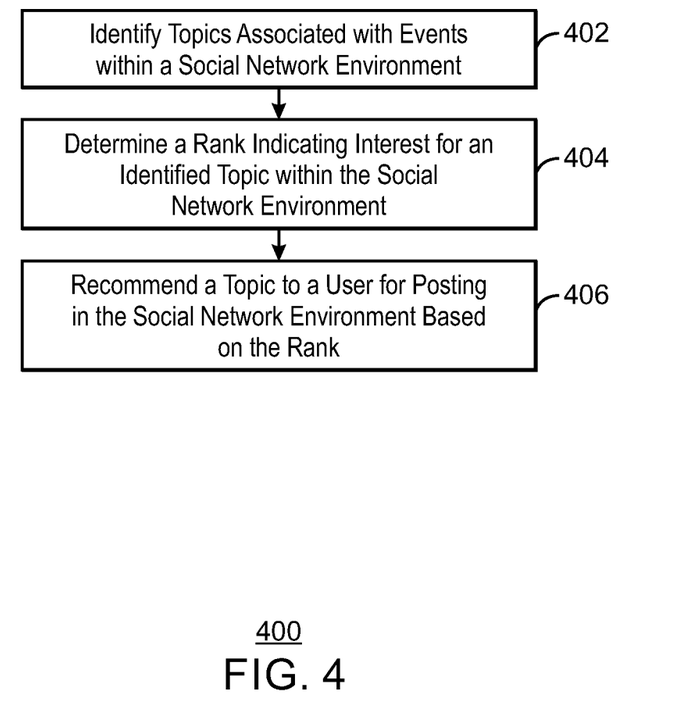
FIG. 4 is a block diagram illustrating a method for topic recommendation.

FIG. 4 is a block diagram illustrating a method for topic recommendation. The method 400 may include identifying, at block 402, topics associated with events within a social network environment. The method 400 may include determining, at block 404, a rank indicating interest for an identified topic within the social network environment. At block 406, the method 400 may include recommending a topic to a user for posting in the social network environment based on the rank.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
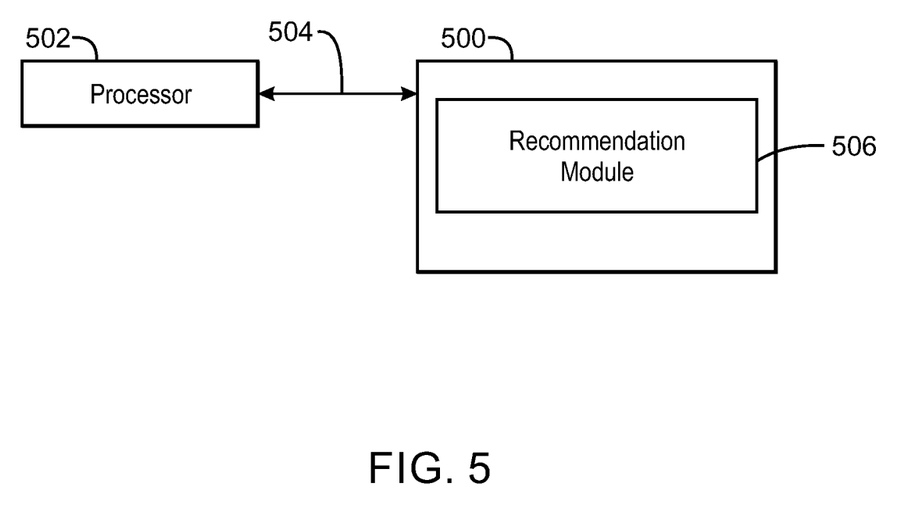
FIG. 5 is a block diagram depicting an example of a tangible, non-transitory computer-readable medium that can be used to recommend topics within a social network environment.

FIG. 5 is a block diagram depicting an example of a tangible, non-transitory computer-readable medium that can be used to recommend topics within a social network environment. The tangible, non-transitory, computer-readable medium 500 may be accessed by a processor 502 over a computer bus 504. Furthermore, the tangible, non-transitory, computer-readable medium 500 may include computer-executable instructions to direct the processor 502 to perform the steps of the current method.

The various software components discussed herein may be stored on the tangible, non-transitory, computer-readable medium 500, as indicated in FIG. 5. For example, a recommendation module 506 may be configured to identify, by the processor, topics associated with events within a social network environment. The recommendation module 506 may be configured to determine, by the processor, a rank indicating interest for an identified topic within the social network environment. The recommendation module 506 may be configured to recommend, by the processor, a topic to a user for posting in the social network environment based on the rank.

The flowchart and block diagrams in the FIGS. 1-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying, within a social network environment of a user, a plurality of events;
   determining, for the identified plurality of events, a plurality of topics;
   presenting, to the user, the plurality of topics;
   compiling a plurality of posts, within the social network environment, associated with the presented plurality of topics;
   presenting, to the user and with the plurality of topics, the plurality of posts;
   receiving, from the user, a selection of a new subset of the social network environment; and
   presenting, to the user and based upon the new subset, a different plurality of topics, wherein
   the plurality of topics are presented in a ranked order, and
   the plurality of topics are determined based upon a user-centric subset of the social network environment of the user.

2. The method of claim 1, wherein
   the plurality of topics are determined based upon the user-centric subset having an actor or target role in the identified plurality of events.

3. The method of claim 1, wherein
   the plurality of topics are determined based upon recommendations of other users in a management chain of the user.

4. The method of claim 1, wherein
   the social network environment of the user is of an enterprise environment related to employment of the user.

5. A computer hardware system, comprising:
   a hardware processor configured to initiate the following operations:
   identifying, within a social network environment of a user, a plurality of events;
   determining, for the identified plurality of events, a plurality of topics;
   presenting, to the user, the plurality of topics;
   compiling a plurality of posts, within the social network environment, associated with the presented plurality of topics;
   presenting, to the user and with the plurality of topics, the plurality of posts;
   receiving, from the user, a selection of a new subset of the social network environment; and
   presenting, to the user and based upon the new subset, a different plurality of topics, wherein
   the plurality of topics are presented in a ranked order, and
   the plurality of topics are determined based upon a user-centric subset of the social network environment of the user.

6. The system of claim 5, wherein
   the plurality of topics are determined based upon the user-centric subset having an actor or target role in the identified plurality of events.

7. The system of claim 5, wherein
   the plurality of topics are determined based upon recommendations of other users in a management chain of the user.

8. The system of claim 5, wherein
   the social network environment of the user is of an enterprise environment related to employment of the user.

9. A computer program product, comprising:
   a computer hardware storage device having stored therein computer-usable program code,
   the computer-usable program code, which when executed by a computer hardware system, causes the computer hardware system to perform:
   identifying, within a social network environment of a user, a plurality of events;
   determining, for the identified plurality of events, a plurality of topics;
   presenting, to the user, the plurality of topics;
   compiling a plurality of posts, within the social network environment, associated with the presented plurality of topics;
   presenting, to the user and with the plurality of topics, the plurality of posts;
   receiving, from the user, a selection of a new subset of the social network environment; and
   presenting, to the user and based upon the new subset, a different plurality of topics, wherein
   the plurality of topics are presented in a ranked order, and
   the plurality of topics are determined based upon a user-centric subset of the social network environment of the user.

10. The computer program product of claim 9, wherein the plurality of topics targets are determined based upon the user-centric subset having an actor or target role in the identified plurality of events.

11. The computer program product of claim 9, wherein
    the plurality of topics are determined based upon recommendations of other users in a management chain of the user.

* * * * *